(12) United States Patent
Harrison et al.

(10) Patent No.: US 9,615,636 B2
(45) Date of Patent: Apr. 11, 2017

(54) METHOD FOR MANUFACTURING A CANOPY APPARATUS

(71) Applicants: Dewitt Gary Harrison, Dunnellon, FL (US); William Greg Harrison, Dunnellon, FL (US)

(72) Inventors: Dewitt Gary Harrison, Dunnellon, FL (US); William Greg Harrison, Dunnellon, FL (US)

(73) Assignee: Always Shady, LLC, Dunnellon, FL (US)

( * ) Notice: Subject to any disclaimer, the term of this patent is extended or adjusted under 35 U.S.C. 154(b) by 457 days.

(21) Appl. No.: 14/489,923

(22) Filed: Sep. 18, 2014

(65) Prior Publication Data

US 2015/0000101 A1  Jan. 1, 2015

Related U.S. Application Data

(63) Continuation-in-part of application No. 13/730,820, filed on Dec. 28, 2012, now abandoned.

(51) Int. Cl.
*A45B 11/00* (2006.01)
*F16M 11/14* (2006.01)
(Continued)

(52) U.S. Cl.
CPC ............ *A45B 11/00* (2013.01); *F16M 11/14* (2013.01); *F16M 11/2078* (2013.01); *F16M 13/02* (2013.01); *A45B 15/00* (2013.01); *A45B 2025/003* (2013.01); *A45F 3/52* (2013.01); *Y10T 29/49826* (2015.01)

(58) Field of Classification Search
CPC ... A45B 11/00; A45B 15/00; A45B 2025/003; A45B 17/00; F16M 13/02; F16M 11/14; F16M 11/2078; F16M 11/12; Y10T 29/49826; A45F 3/52; F16C 11/106
See application file for complete search history.

(56) References Cited

U.S. PATENT DOCUMENTS

RE3,792 E   1/1870   Heermance
230,521 A   7/1880   Barker
(Continued)

OTHER PUBLICATIONS

Clavey, Clayey Raft Frame Umbrella Stand, viewed at: http://www.clavey.com on Aug. 1, 2011 [Admitted prior art].
(Continued)

*Primary Examiner* — David Bryant
*Assistant Examiner* — Jun Yoo
(74) *Attorney, Agent, or Firm* — Law Office of Steven R. Olsen, PLLC; Steven R. Olsen

(57) ABSTRACT

Embodiments of the invention provide a canopy system and a method for manufacturing at least a portion of the canopy system. The canopy system may include: a canopy that includes a shaft and a canopy ball coupled to the shaft; a double socket arm connected to the canopy via the canopy ball; and a mount, the mount having a mounting ball, the mount connected to the double socket arm via the mounting ball, the canopy system thus configured for a wide range of canopy articulation with respect to the mount. Alternative embodiments are provided for the shaft, double socket arm and mounts. A manufacturing process is provided for securing the canopy ball to the shaft.

11 Claims, 10 Drawing Sheets

(51) Int. Cl.
  *F16M 11/20*  (2006.01)
  *F16M 13/02*  (2006.01)
  *A45F 3/52*  (2006.01)
  *A45B 25/00*  (2006.01)
  *A45B 15/00*  (2006.01)

(56) References Cited

U.S. PATENT DOCUMENTS

| | | | |
|---|---|---|---|
| 467,761 | A | 1/1892 | Whaler |
| 488,549 | A | 12/1892 | Dugan |
| 497,068 | A | 5/1893 | Coffin |
| 602,760 | A | 4/1898 | Lines |
| 615,055 | A | 11/1898 | Woods |
| 683,513 | A | 10/1901 | Sprague |
| 787,486 | A | 4/1905 | Whipple |
| 840,241 | A | 1/1907 | Nootbaar |
| 903,682 | A | 11/1908 | Cumpston |
| 1,996,071 | A | 4/1935 | Kahn |
| 2,767,723 | A | 10/1956 | Sears, Jr. |
| 2,822,143 | A | 2/1958 | Johansen |
| 2,984,249 | A | 5/1961 | Sears, Jr. |
| 3,304,035 | A | 2/1967 | Davis |
| 3,848,838 | A * | 11/1974 | Thomas ............ A47C 7/66 248/231.51 |
| 3,935,874 | A | 2/1976 | Cohen |
| 4,491,435 | A | 1/1985 | Meier |
| 4,674,523 | A | 6/1987 | Glatz |
| 4,871,141 | A | 10/1989 | Chen |
| 5,086,797 | A | 2/1992 | Earnshaw et al. |
| 5,845,885 | A | 12/1998 | Carnevali |
| 5,937,881 | A | 8/1999 | Villa |
| 6,082,694 | A | 7/2000 | Joyce |
| 6,328,046 | B2 | 12/2001 | Doreste |
| 6,561,476 | B2 | 5/2003 | Carnevali |
| 7,090,181 | B2 | 8/2006 | Biba et al. |
| 7,395,828 | B1 * | 7/2008 | Pulley ............ A45B 11/00 135/16 |
| 7,594,514 | B2 | 9/2009 | Fereghetti et al. |
| 7,726,618 | B2 | 6/2010 | Pedemonte |
| RE42,060 | E | 1/2011 | Carnevali |
| RE42,581 | E | 8/2011 | Carnevali |
| 2002/0139403 | A1 | 10/2002 | Shi |
| 2005/0225184 | A1 * | 10/2005 | Akiba ............ B25C 1/08 310/62 |
| 2006/0054772 | A1 | 3/2006 | Priscott et al. |
| 2009/0136290 | A1 | 5/2009 | Persson |

OTHER PUBLICATIONS

RAM Mounts, UNPKD RAM Umbrella Saddle, viewed at: http://www.ram-mount.com on Jul. 31, 2011 [Admitted prior art].
Sportsmanguide, Reel Shade Umbrella, viewed at: http://www.sportsmanguide.com on Oct. 21, 2011 [Admitted prior art].
Downriverequip, Umbrella Holders—Deluxe, viewed at http://downriverequip.com on Aug. 1, 2011 [Admitted prior art].
RAM Mounts, UNPKD RAM DBL Ball socket Arm Plastic, viewed at: http://www.ram-mount.com on Aug. 2, 2011 [Admitted prior art].

* cited by examiner

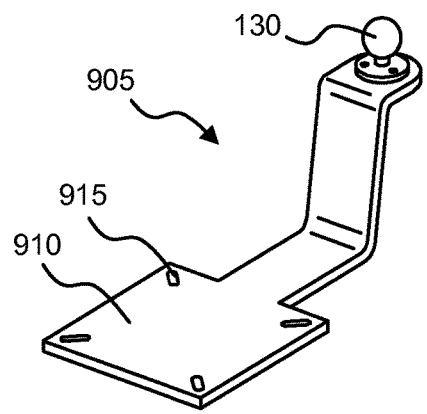
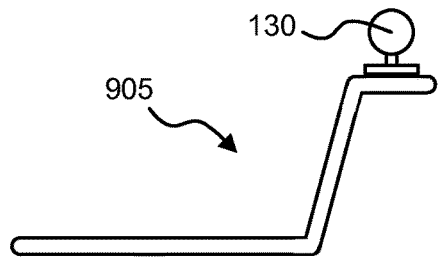
FIG. 9    FIG. 10
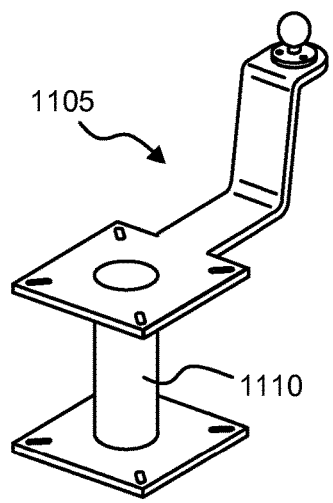
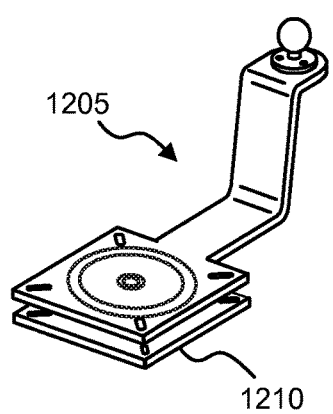
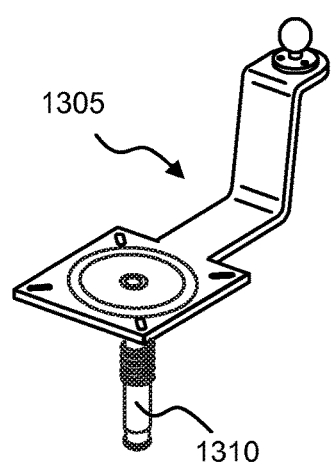
FIG. 11    FIG. 12    FIG. 13

METHOD FOR MANUFACTURING A CANOPY APPARATUS

CROSS-REFERENCE TO RELATED APPLICATIONS

This is a continuation-in-part (CIP) of U.S. application Ser. No. 13/730,820, filed Dec. 28, 2012.

FIELD OF INVENTION

The invention relates generally to an apparatus that includes a canopy, a/k/a an umbrella or parasol. More specifically, but without limitation, embodiments of the invention include a method for manufacturing at least a portion of the apparatus.

BACKGROUND

Canopies can be utilized to shield a user from rain, sun, or other environmental conditions. Known canopies have many disadvantages, however. For instance, fixed canopies often suffer from limited ranges of articulation. They may, for example, only tilt along a single plane. Although patio table stands are common, fixed canopies typically have limited mounting options for other applications. Improved canopy systems and methods for manufacturing them are therefore needed.

SUMMARY OF THE INVENTION

Embodiments of the invention solve one or more of the shortcomings described above by affixing a canopy ball onto a shaft of the canopy, and coupling a double-socket arm between the canopy ball and a mounting ball. The double-socket arm provides a wide range of articulation in multiple planes. This specification also discloses a method for manufacturing at least a portion of the disclosed apparatus.

BRIEF DESCRIPTION OF THE DRAWINGS

Embodiments of the invention are described with reference to the following drawings, wherein:

FIG. 9 is a perspective view of a chair mounting bracket, according to an embodiment of the invention;

FIG. 10 is a side view of the chair mounting bracket illustrated in FIG. 9;

FIG. 11 is a perspective view of a chair mounting bracket, according to an embodiment of the invention;

FIG. 12 is a perspective view of a chair mounting bracket, according to an embodiment of the invention;

FIG. 13 is a perspective view of a chair mounting bracket, according to an embodiment of the invention;

DETAILED DESCRIPTION

Figure 1:
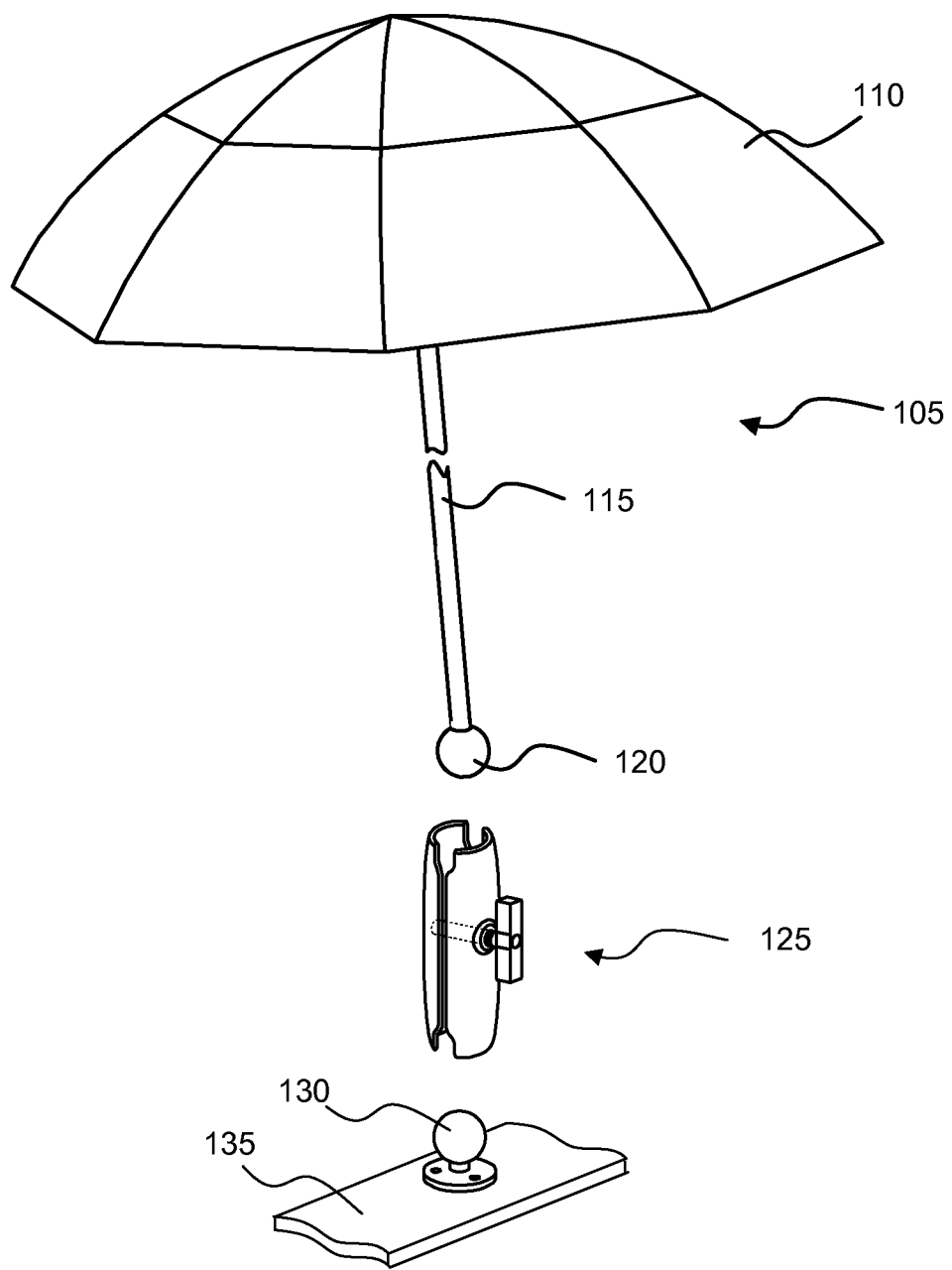
FIG. 1 is a perspective view of a canopy system, according to an embodiment of the invention.

Embodiments of the invention are described below with reference to FIGS. 1-23. In the drawings, the same reference designators are used for the same or similar features. The drawings are not necessarily to scale; certain features may be exaggerated for purposes of illustration.

FIG. 1 is a perspective view of a canopy system, according to an embodiment of the invention. As illustrated in FIG. 1, a canopy 105 is coupled to a mounting ball 130 on a base 135 via a double-socket arm 125. The canopy 105 includes a cover 110, shaft 115, and a canopy ball 120. The canopy 105 may include vents (not shown) typical in a wind-resistant umbrella. A frame (not shown) of the canopy 105 may be constructed, for example, of metal. A covering on the canopy 105 may be nylon or other fabric as required by application demands. Preferably, the canopy covering provides excellent protection from ultraviolet radiation, for instance with an Ultraviolet Protection Factor (UPF) of >300, blocking 99.99 percent of UV-A radiation and 99.98 percent of UV-B radiation. The shaft 115 is preferably manufactured from Fiber Reinforced Plastic (FRP). But the shaft 115, canopy ball 120, double-socket arm 125, and/or mounting ball 130 may be fabricated using wood, metal, plastic, fiberglass, and/or other rigid material, according to design choice. In embodiments of the invention, the canopy 105 may be collapsible. The shaft 115 may be telescopic.

In use, the double-socket arm 125 retains the canopy ball 120 and the mounting ball 130 to provide an articulated coupling between the base 135 and the canopy 105.

Figure 2:
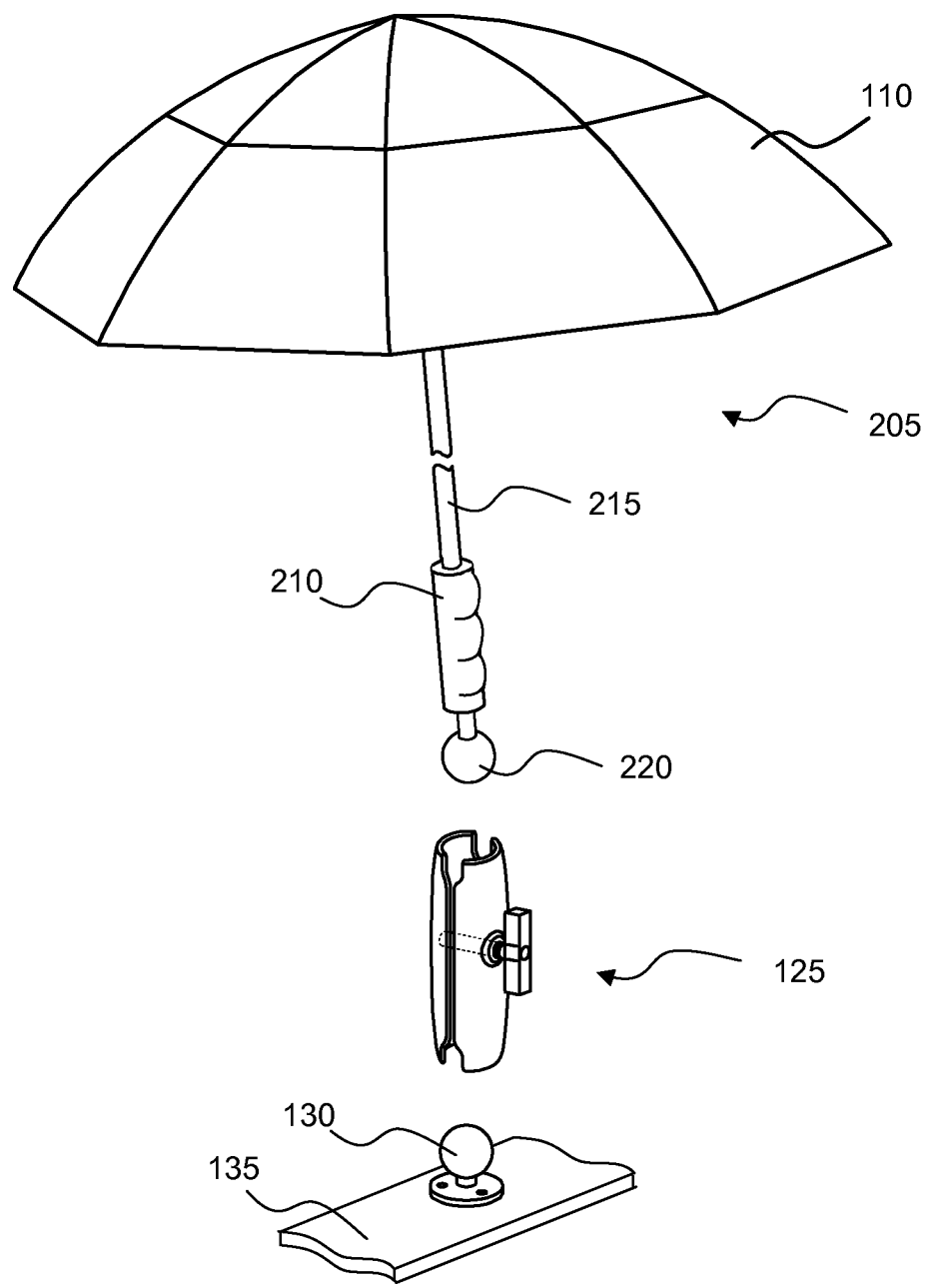
FIG. 2 is a perspective view of a canopy system, according to an embodiment of the invention.

FIG. 2 is a perspective view of a canopy system, according to an embodiment of the invention. As illustrated in FIG. 2, a canopy 205 may include a contoured handle 210 and canopy ball 220 on a shaft 215. The canopy 205 may include vents (not shown) typical in a wind-resistant umbrella. A frame (not shown) of the canopy 205 may be constructed, for example, of metal. A covering on the canopy 205 may be nylon or other fabric as required by application demands. The shaft 215 and/or canopy ball 220 may be fabricated using wood, metal, plastic, fiberglass, and/or other rigid material, according to design choice. In embodiments of the invention, the canopy 205 may be collapsible. The shaft 215 may be telescopic.

Advantageously, the canopy 205 may be used in either portable applications or in fixed applications. In portable applications, a user may grasp the canopy 205 using the contoured handle 210. In fixed applications, the canopy 205 is coupled to the base 135 via the double-socket arm 125.

Figure 3A:
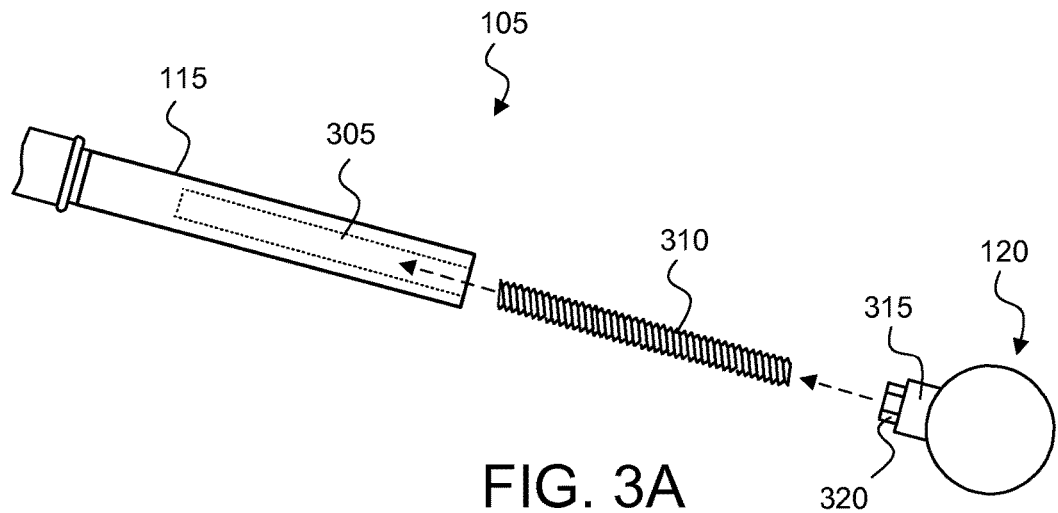
FIG. 3A is an exploded assembly view of a portion of a canopy, according to an embodiment of the invention.

FIG. 3A is an exploded assembly view of a portion of a canopy 105, according to an embodiment of the invention. As illustrated in FIG. 3A, a portion of the canopy 105 may include a cavity 305 in the shaft 115. The cavity 305 is configured to receive a threaded insert 310. In the illustrated embodiment, the canopy ball 120 includes a neck 315, wrench surfaces 320, and a threaded aperture (not shown). The threaded aperture (not shown) is also configured to cooperate with the threaded insert 310.

Figure 3B:
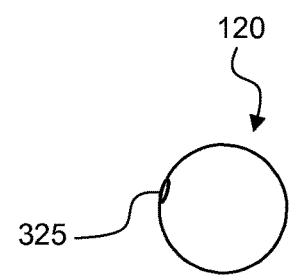
FIG. 3B is a perspective view of a canopy ball, according to an embodiment of the invention.

FIG. 3B is a perspective view of a canopy ball, according to an embodiment of the invention. In the illustrated embodiment the canopy ball 120 includes a threaded aperture 325 but does not include a neck or wrench surfaces.

Figure 4:
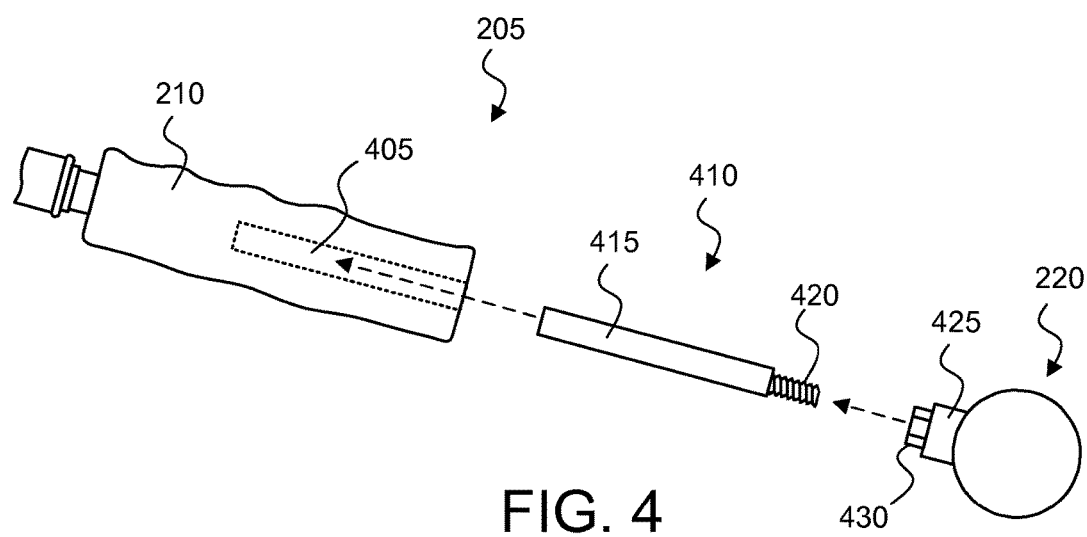
FIG. 4 is an exploded assembly view of a portion of a canopy, according to an embodiment of the invention.

FIG. 4 is an exploded assembly view of a portion of a canopy 205, according to an embodiment of the invention. As illustrated in FIG. 4, the contoured handle 210 may include a cavity 405. The canopy ball 220 may include a neck 425, wrench surfaces 430, and a threaded aperture (not shown). An insert 410 may include a smooth portion 415 and a threaded portion 420. The smooth portion 415 of the insert 410 is configured to be inserted into the cavity 405. The treaded portion 420 is configured to be inserted into the threaded aperture in the canopy ball 220.

Variations to the configurations illustrated in FIGS. 3A and 4 are possible. For instance, the threaded insert 310 could be substituted for the insert 410 in FIG. 4. Likewise, the insert 410 could be substituted for the threaded insert 310 in the embodiment illustrated in FIG. 3A. Moreover, the canopy ball 120 illustrated in FIG. 3B could be substituted for the canopy ball 120 illustrated in FIG. 3A or the canopy ball 220 illustrated in FIG. 4, according to design choice.

FIGS. 5 through 8 illustrate alternative embodiments for the double-socket arm 125.

Figure 5:
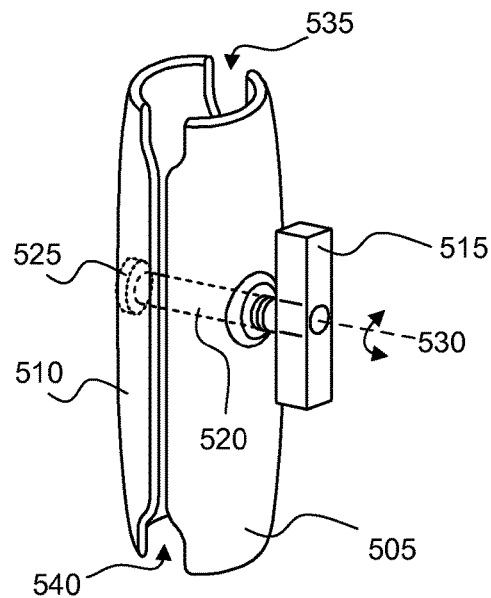
FIG. 5 is a perspective view of a double-socket arm, according to an embodiment of the invention.

FIG. 5 is a perspective view of a double-socket arm, according to an embodiment of the invention. As illustrated in FIG. 5, a front panel 505 may be coupled to a rear panel 510 via a threaded shaft 520. One end of the threaded shaft 520 is coupled to a "T" handle 515 and an opposite end of the shaft 520 is affixed to a retainer 525. In operation, the "T" handle 515 may be rotated about an axis 530 (the longitudinal axis of the threaded shaft 520). Tightening the "T" handle 515 draws the front panel 505 closer to the rear panel 510, reducing the size of sockets 535 and 540.

Figure 6:
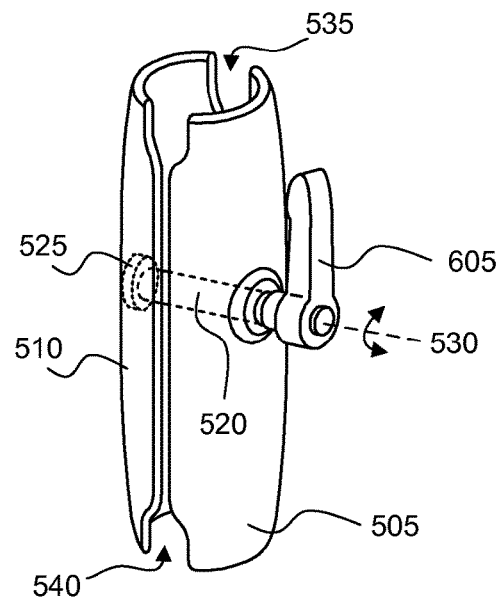
FIG. 6 is a perspective view of a double-socket arm, according to an embodiment of the invention.

FIG. 6 is a perspective view of a double-socket arm, according to an embodiment of the invention. As illustrated in FIG. 6, the "T" handle 515 may be replaced with a lever handle 605. In use, the lever handle 605 may be rotated about the axis 530. Tightening the lever handle 605 draws the front panel 505 closer to the rear panel 510, reducing the size of sockets 535 and 540.

Figure 7:
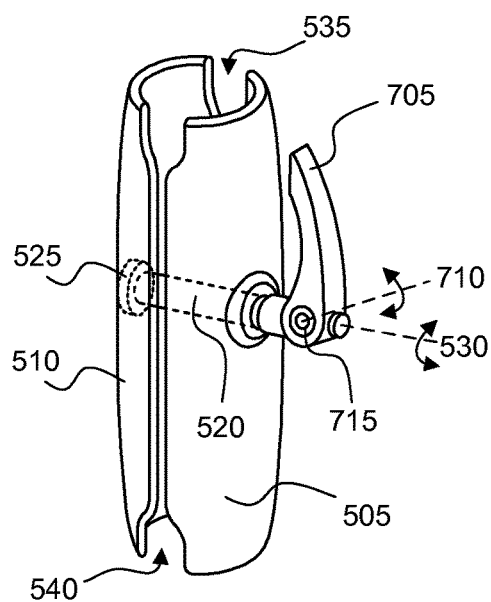
FIG. 7 is a perspective view of a double-socket arm, according to an embodiment of the invention.

FIG. 7 is a perspective view of a double-socket arm, according to an embodiment of the invention. As illustrated in FIG. 7, the "T" handle 515 illustrated in FIG. 5 may be replaced with a cam lever 705. In operation, the cam lever 705 may first be extended along the axis 530. Rotating the cam lever 705 about the axis 530 provides initial tightening. Final tightening may be achieved by rotating the cam lever 705 about the axis 710 into the final closed position illustrated in FIG. 7. The axis 710 may be defined by the pivot point 715. Tightening the cam lever 705 draws the front panel 505 closer to the rear panel 510, reducing the size of sockets 535 and 540.

Figure 8:
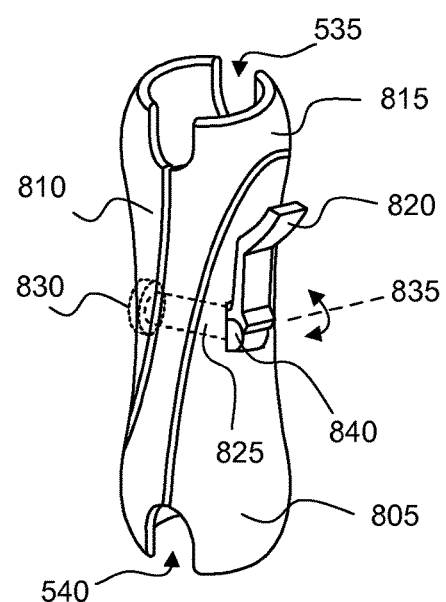
FIG. 8 is a perspective view of a double-socket arm, according to an embodiment of the invention.

FIG. 8 is a perspective view of a double-socket arm, according to an embodiment of the invention. As illustrated in FIG. 8, a front panel 805, a middle panel 815, and a rear panel 810 are be retained by a threaded shaft 825. One end of threaded shaft 825 is coupled to a cam lever 820. An opposite end of the threaded shaft 825 is coupled to a retainer 830. In operation, the cam lever 820 may be rotated about axis 835. Axis 835 is defined according to pivot point 840. Tightening the cam lever 820 draws the front panel 805 closer to the rear panel 810, reducing the size of sockets 535 and 540.

Variations to the double-socket arms illustrated in FIGS. 5-8 are possible. For instance, in alternative embodiments, the retainer 525 could be integrated into the rear panel 510. Similarly, the retainer 830 could be integrated into the rear panel 810. Moreover, any of the embodiments described with reference to FIGS. 5-8 could also include pivot points and/or springs between opposing panels.

U.S. Pat. No. 5,845,885 issued to Carnevali on Dec. 8, 1998 is hereby incorporated by reference for its description of a universally positionable mounting device that is consistent with a variant of the double-socket arm embodiment illustrated in FIG. 5. U.S. Pat. No. 7,090,181 issued to Biba et al. on Aug. 15, 2006 is incorporated by reference for its description of a ball and socket mounting assembly that is consistent with a variant of the double-socket arm embodiment illustrated in FIG. 8.

FIG. 9 is a perspective view of a chair mounting bracket, according to an embodiment of the invention. As illustrated in FIG. 9, one end of a chair mounting bracket 905 is configured to receive the mounting ball 130. In addition, the chair mounting bracket 905 has a mounting portion 910 that includes mounting holes 915. The chair mounting bracket 905 is configured to cooperate with a chair. Alternative chair mounting brackets are discussed below with reference to FIGS. 11-13. FIG. 10 is a side view of the chair mounting bracket 905 illustrated in FIG. 9.

FIG. 11 is a perspective view of a chair mounting bracket 1105 that includes a pedestal mount portion 1110, according to an embodiment of the invention. FIG. 12 is a perspective view of a chair mounting bracket 1205 that includes a swivel plate 1210, according to an embodiment of the invention. The swivel plate 1210 is configured to rotate about a normal axis passing through a center of the swivel plate 1210, such rotation being with respect to other portions of the chair mounting bracket 1205. FIG. 13 is a perspective view of a chair mounting bracket 1305 that includes a locking pin 1310, according to an embodiment of the invention. The locking pin 1310 is configured to cooperate with a base plate (not shown) such that the chair mounting bracket 1305 can swivel about a longitudinal axis of the locking pin 1310. The locking pin 1310 is also configured to be suitably retained in the base plate (not shown) during use.

Figure 14:
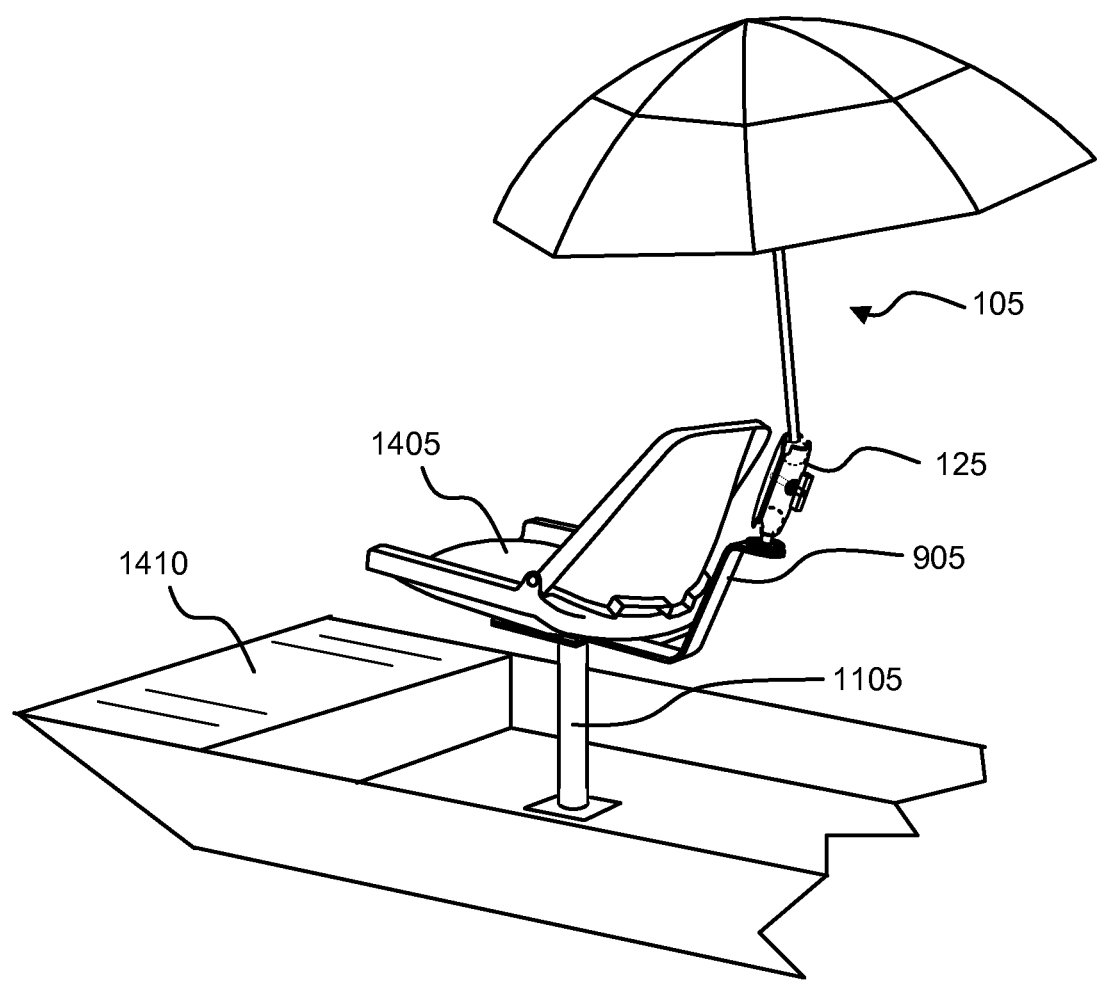
FIG. 14 is a perspective view of a canopy system coupled to a chair, according to an embodiment of the invention.

FIG. 14 is a perspective view of a canopy system coupled to a chair, according to an embodiment of the invention. As illustrated in FIG. 11, a canopy 105 is coupled to the chair mounting bracket 1105 via the double socket arm 125. A canopy 205 could be substituted in place of the canopy 105. A portion of the chair mounting bracket 1105 is disposed between a floor of the dinghy 1410 and the chair 1405. In alternative embodiments, chair mounting brackets 905, 1205 or 1305 could be used instead of the chair mounting bracket 1105.

Figure 15:
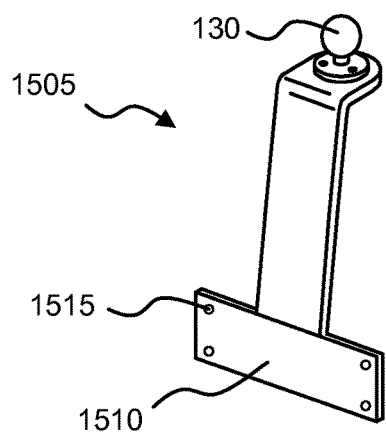
FIG. 15 is a perspective view of a bench seat mounting bracket, according to an embodiment of the invention.
Figure 16:
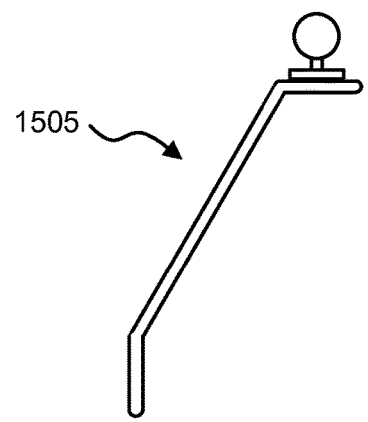
FIG. 16 is a side view of the bench seat mounting bracket illustrated in FIG. 15.

FIG. 15 is a perspective view of a bench seat mounting bracket 1505, according to an embodiment of the invention. As illustrated in FIG. 15, a bench seat mounting bracket 1505 is configured to receive a mounting ball 130. In addition, the bench seat mounting bracket 1505 has a mounting portion 1515 that includes mounting holes 1515. FIG. 16 is a side view of the bench seat mounting bracket 1505 illustrated in FIG. 15.

Figure 17:
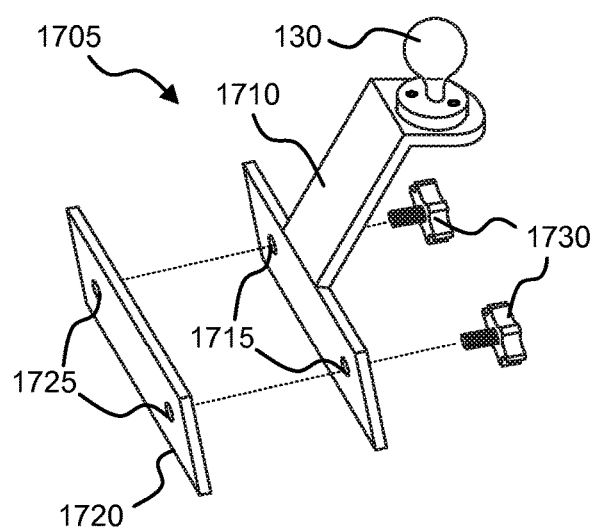
FIG. 17 is a perspective view of a bench seat mounting assembly, according to an embodiment of the invention.
Figure 18:
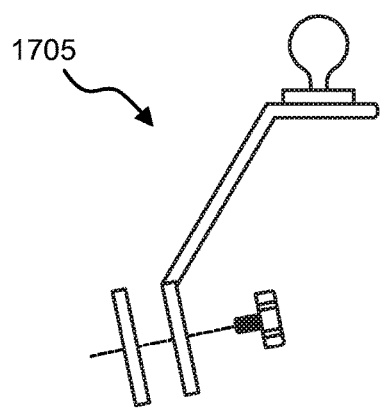
FIG. 18 is a side view of the bench seat mounting assembly illustrated in FIG. 17.

FIG. 17 is a perspective view of a bench seat mounting assembly 1705, according to an embodiment of the invention. The arm 1710 includes through-holes 1715 and is configured to receive the mounting ball 130. A retaining plate 1720 includes threaded holes 1725. Handle screws 1730 are configured to cooperate with the through holes 1715 and the threaded holes 1725. In use, a portion of a bench seat (not shown in FIG. 17) is disposed between the arm 1710 and the retaining plate 1720. FIG. 18 is a side view of the bench seat mounting assembly 1705 illustrated in FIG. 17.

Figure 19:
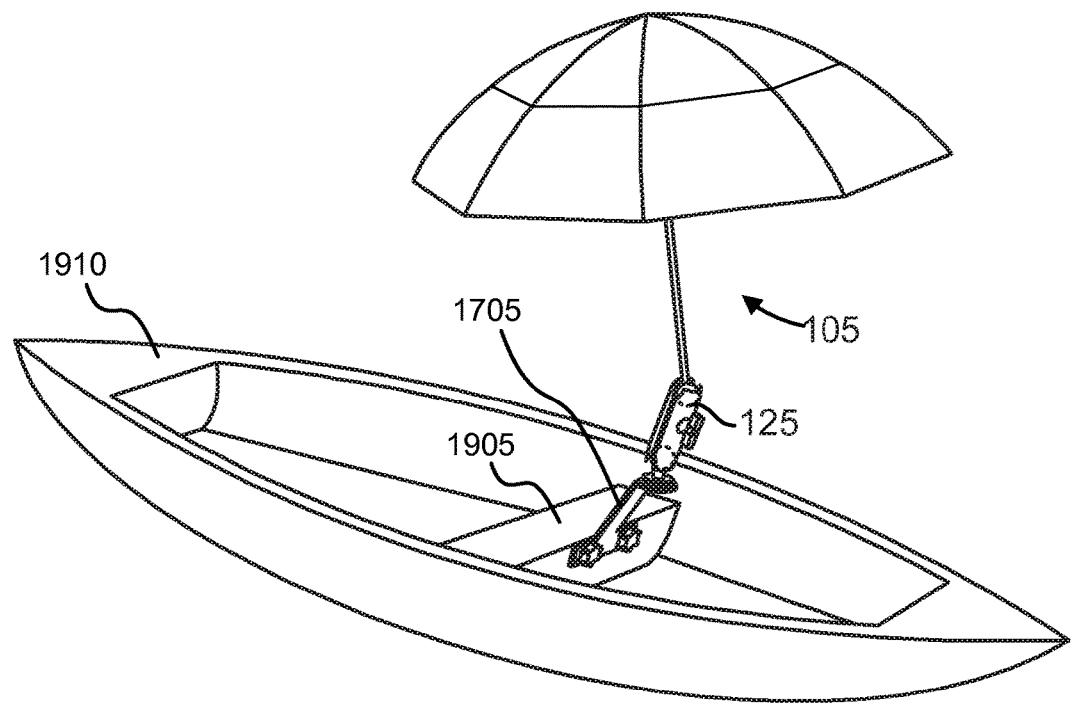
FIG. 19 is a perspective view of a canopy system coupled to a bench seat, according to an embodiment of the invention.

FIG. 19 is a perspective view of a canopy system coupled to a bench seat, according to an embodiment of the invention. As illustrated in FIG. 19, a canopy 105 may be coupled to a bench seat mounting assembly 1705 via a double socket arm 125. A canopy 205 could be substituted in place of the canopy 105. The bench seat mounting assembly 1705 is affixed to bench seat 1905 as described above with reference to FIG. 17. In an alternative embodiment, the bench seat mounting bracket 1505 could be used instead. As FIG. 19 illustrates, bench seat 1905 is consistent with seats found, for example, in a canoe 1910. Bench seats may also be found in kayaks or other small watercraft. In embodiments of the invention, bench seat mounting bracket 1505 and/or bench seat mounting assembly 1705 may also be applicable to patio benches, lawn chairs, or other types of furnishings.

Figure 20:
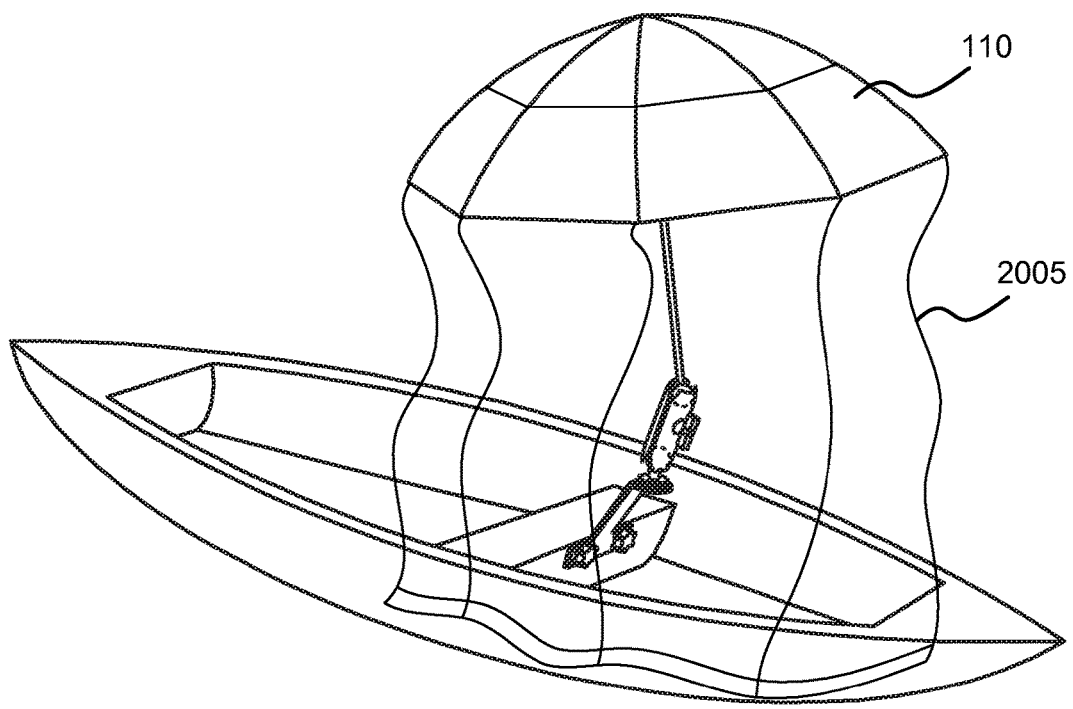
FIG. 20 is a perspective view of a canopy system that includes a mosquito net, according to an embodiment of the invention.

FIG. 20 is a perspective view of a canopy system that includes a mosquito net, according to an embodiment of the invention. As illustrated in FIG. 20, a mosquito net 2005 can be connected to the cover 110, for instance by stitching, snaps, zipper or other suitable fastener. Such mosquito netting could be included with any of the canopy systems disclosed herein.

Figure 21:
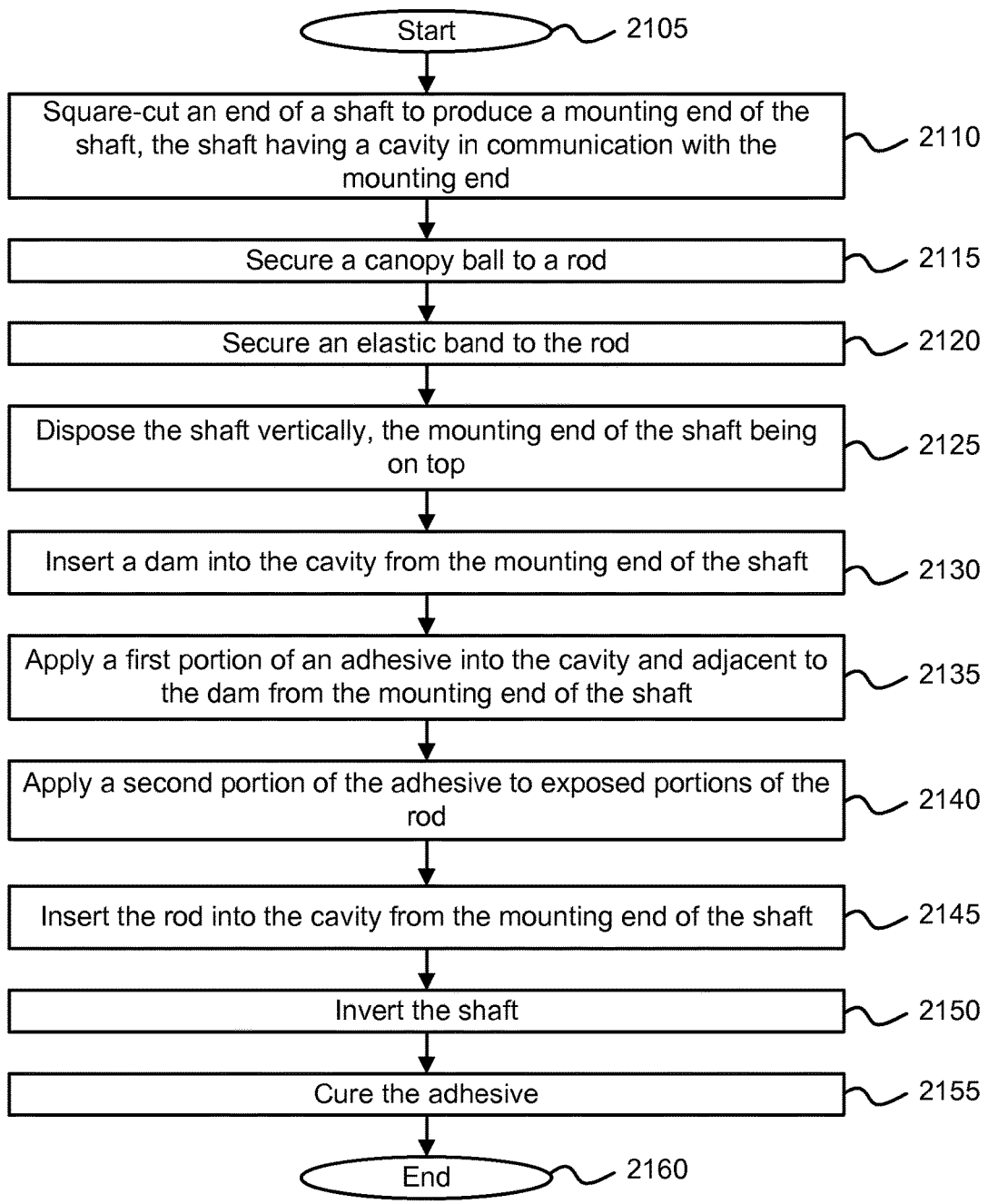
FIG. 21 is a flow diagram of a manufacturing process, according to an embodiment of the invention.

FIG. 21 is a flow diagram of a manufacturing process for at least a portion of a canopy 105, according to an embodiment of the invention. The process may be further understood with reference to FIGS. 22 and 23.

After starting in step 2105, the process square-cuts an end of a shaft 115 in step 2110 to produce a mounting end 2220 of the shaft 115. The shaft 115 has a cavity 305 in communication with the mounting end 2220. Step 2110 may be required, for instance, if the shaft 115 is received with a rough or un-square cut on an end of the shaft 115. In embodiments of the invention, a chop saw or similar saw may be used in step 2110. For instance, step 2110 could be accomplished using an abrasive saw with a 3 inch diameter aluminum oxide abrasive disc, together with a suitable fixture to hold the shaft 115 during cutting.

In step 2115, the process secures a canopy ball to a rod. In the embodiment illustrated in FIG. 22, the canopy ball 120 includes a threaded aperture in a neck 315. In the illustrated embodiment, the rod 310 may be, for example, a stainless steel threaded insert. In this instance, step 2115 includes threading the rod 310 into the canopy ball 120, preferably with the application of Red Loctite™ or other thread locker.

Figure 22:
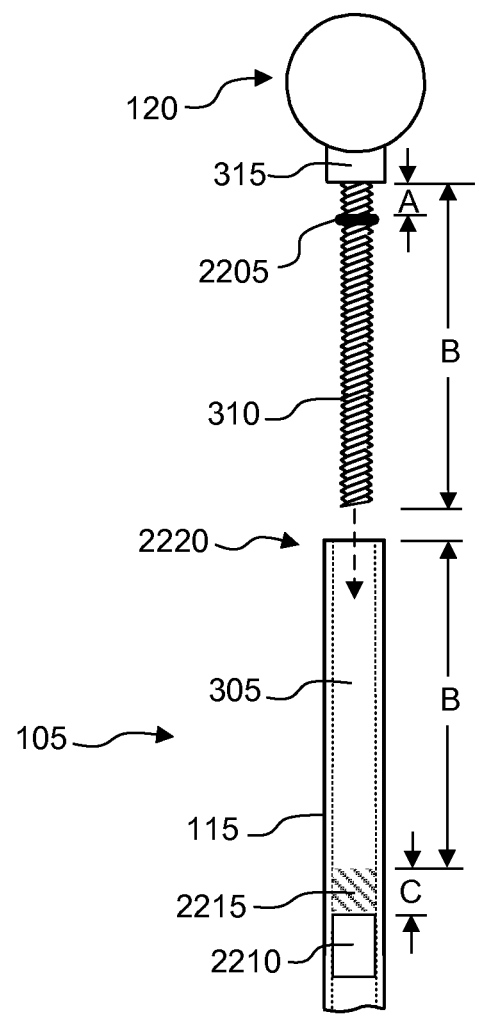
FIG. 22 is an exploded assembly view of a portion of a canopy, according to an embodiment of the invention.

Next, in step 2120, the process secures an elastic band 2205 to the rod 310. The elastic band 2205 is preferably manufactured from relatively soft rubber. For instance, for a rod 310 with a ⅜ inch thread, a suitable elastic band 2205 is an orthodontic elastic band of medium thickness and a 5/16 inch diameter when in a relaxed state. The elastic band 2205 is preferably disposed on the rod 310 proximate to the canopy ball 120 as illustrated in FIG. 22. Distance A is preferably less than 0.5 inch and more preferably approx. ⅛ inch. The purpose of the elastic band 2205 is to aid in the alignment of the rod 310 with respect to the shaft 115, which will be discussed further below.

The process then disposes the shaft 115 vertically in step 2125, so that the mounting end 2220 of the shaft 115 is on top. A gluing rack (not shown) may be used to hold the shaft 115 in the desired position.

In step 2130, the process inserts a dam 2210 into the cavity 305 from the mounting end 2220 of the shaft 115. The purpose of the dam 2210 is to restrict the flow of an adhesive (discussed below in step 2135). A 1 inch long cotton roll is a suitable dam 2210 for a wide range of adhesive selections. Step 2130 may include using a ram rod (not shown) to push the dam 2210 down the cavity 305. Preferably, the ram rod includes a stop to position the dam 2210 at a predetermined distance (B+C in FIG. 22) from the mounting end 2220 of the shaft 115. If the ram rod is a threaded rod, locking nuts configured to interfere with the shaft 115 can form a suitable stop.

After the dam 2210 is in place, the process applies a first portion 2215 of adhesive into the cavity 305 and adjacent to the dam 2210 from the mounting end 2220 of the shaft 115 in step 2135. Preferably, the adhesive is a 2-part epoxy. In the case of a 2-part epoxy, a mixing straw (not shown) may be used to dispose the first portion 2215. The mixing straw could be included, for instance, as part of a syringe. Alternatively, the mixing straw could be coupled to a pneumatic pump. The dam 2210 restricts the flow of the first portion 2215 of the adhesive.

Next, in step 2140, the process applies a second portion (not shown) of the adhesive to exposed portions of the rod 310. Preferably, step 2140 includes dipping the rod 310 into a container of adhesive. Alternatively, step 2140 could include, for example, brushing or spraying the second portion of adhesive onto the rod 310. A suitable adhesive for steps 2135 and 2140 is an epoxy that includes Cougeon Brother's Inc. M1007 resin and M2032 hardener with a mix ratio of approx. 1:1 by volume.

Figure 23:
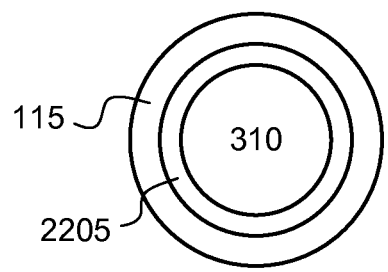
FIG. 23 is a sectional view of a portion of a canopy, according to an embodiment of the invention.

As soon as practical after application step 2140, the process inserts the rod 310 into the cavity 305 from the mounting end 2220 of the shaft 115. FIG. 23 is a sectional view through the elastic band 2205 illustrating that, in the final assembly of the canopy ball 120 to the shaft 115, the elastic band 2205 aids in the alignment of the rod 310 with respect to the shaft 115.

The process inverts the assembled shaft 115 (and entire canopy 105) in step 2150. A curing rack (not shown) is preferably used in step 2150 to hold the shaft 115 in a vertical position and retain the rod 310 in the cavity 305. Advantageously, in this inverted position, the elastic band 2205 restricts the gravitational flow of adhesive out of the mounting end 2220 of the shaft 115. The adhesive is cured in step 2155 before the process terminates in step 2160.

Variations to the process flow illustrated in FIG. 21 are possible. For example, step 2110 may not be required if the shaft 115 is received with a suitably square cut on the mounting end 2220 of the shaft 115. Also, the sequence of certain steps illustrated in FIG. 21 and described above can be varied without consequence. For instance, in alternative embodiments, steps 2115 and 2120 could be performed at any point in the flow prior to step 2140. And the order of steps 2125 and 2130 could be reversed.

In conclusion, embodiments of the invention provide, among other things, a canopy with an articulating arm, alternative mounting brackets, and a method for manufacturing a portion of the canopy. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. In addition, although references are made to embodiments of the invention, all embodiments disclosed herein need not be separate embodiments. In other words, many of the features disclosed herein can be utilized in combinations not expressly illustrated or described.

We claim:

1. A method for manufacturing a canopy comprising:
   securing a canopy ball to a rod;
   securing an elastic band to the rod;
   disposing a shaft vertically, a mounting end of the shaft being on top;
   inserting a dam into a cavity of the shaft from the mounting end, the cavity being in communication with the mounting end;
   applying a first portion of an adhesive into the cavity and adjacent to the dam from the mounting end of the shaft;
   applying a second portion of the adhesive to the rod;
   inserting the rod into the cavity from the mounting end of the shaft;
   inverting the shaft; and
   curing the adhesive.

2. The method of claim 1 further comprising, before applying the first portion of the adhesive, square-cutting an end of the shaft to produce the mounting end.

3. The method of claim 1 wherein the rod is threaded and securing the canopy ball to the rod includes threading the rod into a threaded aperture of the canopy ball.

4. The method of claim 3 wherein threading the rod includes applying a thread locker.

5. The method of claim 1 wherein the dam includes cotton.

6. The method of claim 5 wherein the dam is a cotton roll.

7. The method of claim 1 wherein inserting the dam includes disposing the dam at distance from the mounting end that is greater than a length of rod that extends from the canopy ball when the canopy ball is secured to the rod.

8. The method of claim 7 wherein inserting the dam includes using a ram rod with a stop.

9. The method of claim 1 wherein the adhesive is a 2-part epoxy.

10. The method of claim 9 wherein applying the first portion of the adhesive includes disposing a mixing tube in the cavity.

11. The method of claim 1 wherein applying the second portion of the adhesive includes dipping at least a portion of the rod into a container of adhesive.

* * * * *